Jan. 16, 1951 T. G. SCHMEISER 2,538,167
EARTHWORKING ROLLER UNIT
Filed Feb. 16, 1949 2 Sheets-Sheet 2

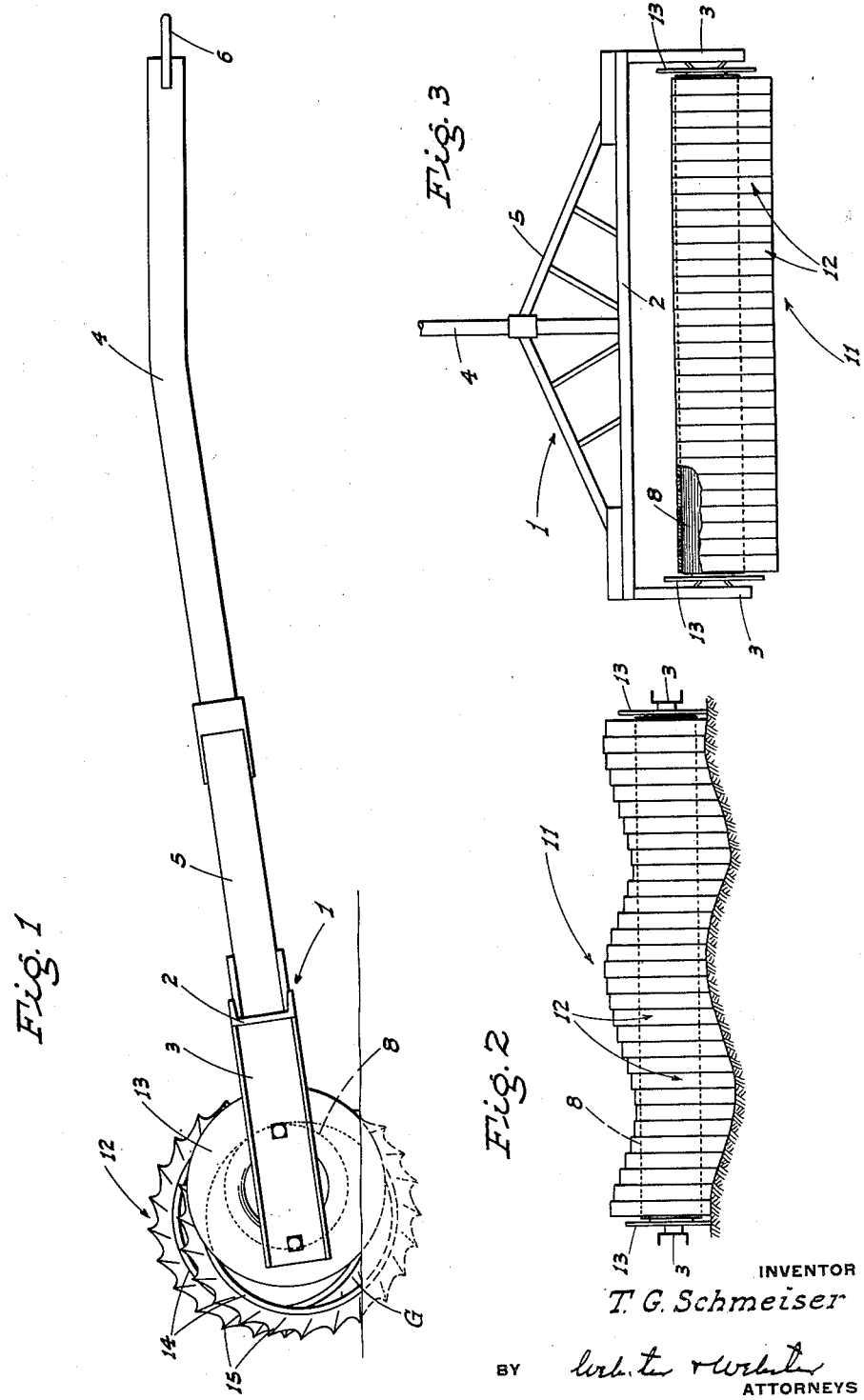

INVENTOR
T. G. Schmeiser

Patented Jan. 16, 1951

2,538,167

UNITED STATES PATENT OFFICE 2,538,167

EARTHWORKING ROLLER UNIT

Theodore G. Schmeiser, Fresno, Calif.

Application February 16, 1949, Serial No. 76,717

4 Claims. (Cl. 55—77)

This invention is directed to an earth working roller unit; one object of the invention being to provide a toothed roller unit, of novel construction and function, adapted to pulverize and pack the top soil of a seed bed as an initial preparatory, or a subsequent maintenance, operation.

Another object of the invention is to provide an earth working roller unit which includes a roller comprising an elongated, transverse draft cylinder surrounded by a transverse row of toothed soil pulverizing and compacting rings, of much greater diameter than the draft cylinder, disposed in free side by side, radially loose-play relation on said draft cylinder whereby said rings individually float on the ground and the roller thus conforms, to ground contour, from end to end thereof. This is especially desirable when the roller unit is used to work along row crop ridges, or the like.

A further object of the invention is to provide an earth working roller unit, as in the preceding paragraph, wherein said pulverizing and compacting rings are hubless and each comprises a relatively large-diameter, internally flat, band-like rim of substantially greater width than thickness; there being a multiplicity of teeth radiating from the ring in circumferentially spaced relation, and such teeth being of lesser width than the ring.

An additional object of the invention is to provide an earth working roller unit which is designed for ease and economy of manufacture.

A further object of the invention is to provide a practical and reliable earth working roller unit, and one which will be exceedingly effective for the purpose for which it is designed.

These objects are accomplished by means of such structure and relative arrangement of parts as will fully appear by a perusal of the following specification and claims.

This application is a continuation in part of copending application, Serial No. 534,570, filed May 8, 1944, on Soil Pulverizing and Rolling Implement; now United States Patent No. 2,472,386, dated June 7, 1949.

In the drawings:

Fig. 1 is a side elevation of the improved earth working roller unit.

Fig. 2 is a somewhat diagrammatic rear end elevation of the implement illustrating the conformity of the row of soil pulverizing and compacting rings to ground contour.

Fig. 3 is a somewhat diagrammatic plan view of the implement showing the normal working position of the draft cylinder in the soil pulverizing and compacting rings.

Figure 4:
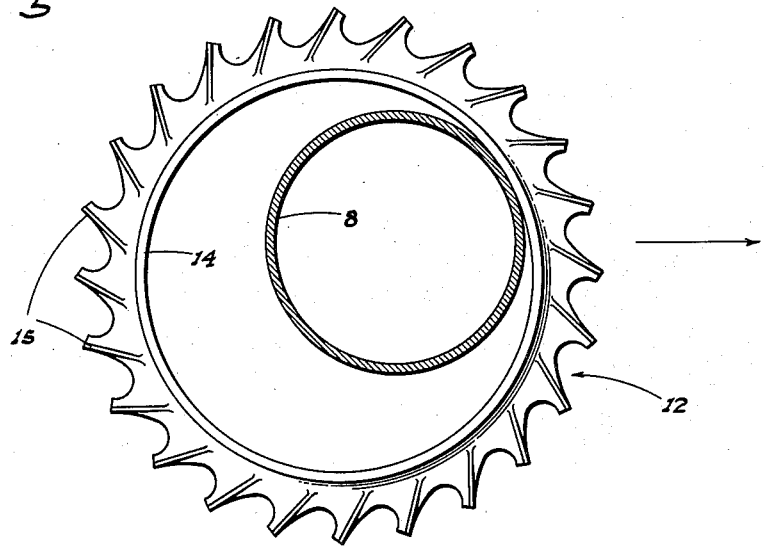
Fig. 4 is an enlarged transverse section through the roller.

Referring now more particularly to the characters of reference on the drawings, the improved earth working roller unit comprises a draft frame, indicated generally at 1, which includes a transverse front beam 2 and rearwardly extending end beams 3; said end beams 3 being relatively short and disposed in parallelism.

A tubular draft tongue 4 projects forwardly from the center of the draft frame 1; said draft tongue being suitably diagonally braced, as at 5. At its forward end the draft tongue 4 includes a hitch 6 for connection to a tractor in draft relation.

The roller of the unit is indicated generally at 7, and such roller comprises the following structural arrangement:

An elongated draft cylinder 8 extends between the end beams 3 in spaced relation rearwardly of the front beam 2; such draft cylinder 8 being fitted, at the ends, with bearing assemblies 9 attached by brackets 10 to said end beams 3, whereby the draft cylinder 8 is rotatable.

A row 11 of soil pulverizing and compacting rings, indicated generally at 12, is disposed on the draft cylinder 8; the outermost or end rings 12 being maintained against escape from the ends of the draft cylinder 8 by retention discs 13 on the ends of said cylinder.

The rings 12 are hubless, and each such ring comprises a relatively large-diameter, internally flat, band-like rim 14 of substantially greater width than thickness. The rim 14 of each ring 12 is formed, in integral relation, with a multiplicity of outwardly projecting, circumferentially spaced, blunt-ended teeth 15 which are of lesser width than the rim 14; the teeth being disposed centrally between opposite edges of said rim.

The internal diameter of the rings 12 is much greater than the external diameter of the draft cylinder 8, whereby said rings 12 are capable of independent loose play in a longitudinal vertical plane; this feature being for the purpose of permitting the rings 12 to closely follow ground contour. In other words, the row 11 of rings 12 always conforms itself to the ground, whereby a more effective pulverizing and compacting action is accomplished. In this connection see particularly Fig. 2.

Additionally, the rings 12 are disposed on the draft cylinder 8 with a certain amount of end play therebetween; this for the purpose of assuring that no binding occurs as said rings relatively work up and down, with resulting self-cleaning of the rings.

This self-cleaning of the rings is further enhanced by reason of the fact that when adjacent rings 12 work relatively up and down a distance greater than the thickness of the rims 14, the inside of the lowermost one of said adjacent rings is exposed, laterally and at the lower portion thereof, below the corresponding portion of the rim of the other one of said adjacent rings whereby material may spill out through the gap G, as in Fig. 1. Adjacent rings 12 can work relatively up and down a distance greater than the thickness of the rims 14, for the reason that the differential between the effective outside diameter of the draft cylinder 8 and the effective inside diameter of the rims 14 is materially in excess of the thickness of said rims.

The blunt-ended teeth 15 are disposed centrally on each rim 14, and are of lesser width to assure that the teeth between adjacent rings do not strike each other upon the rings relatively working up and down, and at times with a slight lateral cocking action by reason of the end play therebetween.

Figure 5:
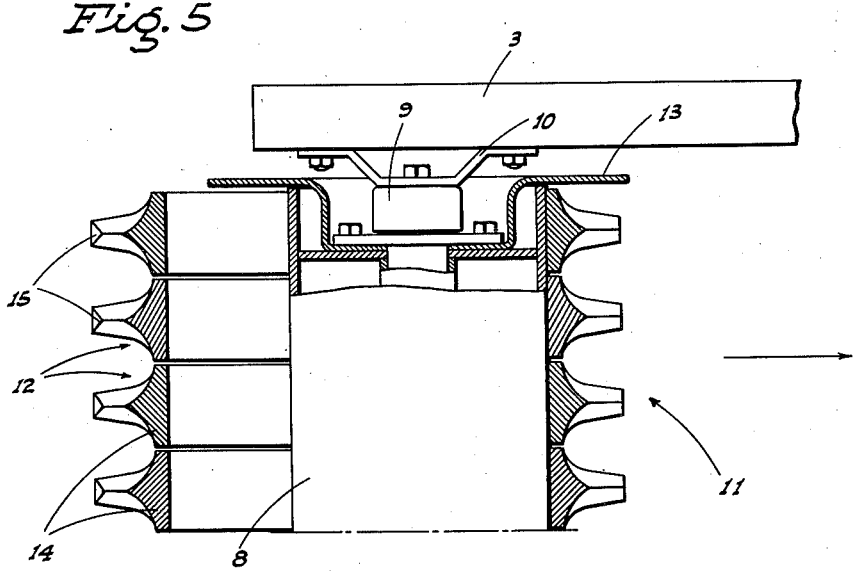
Fig. 5 is an enlarged fragmentary sectional plan view of the roller.

When the described earth working roller unit is in operation advancing along the ground, the draft cylinder 8 bears against a forward portion of the rims 14, as particularly shown in Figs. 4 and 5. At the same time, and by reason of the substantial differential in diameters of said draft cylinder 8, and the rims 14, the rings 12 can relatively work or play up and down (see Fig. 1) for the purpose of conforming to ground contour.

Another feature which assures of relative independent movement of the rings 12 is the fact that such rings, as well as the draft cylinder 8, are rotatable; this feature having the further advantage of preventing any line contact of wear on said draft cylinder 8.

The teeth 15 all incline in one circumferential direction on the rings 12; it being the intention that the implement may be worked with the teeth 15 inclining in the direction or rotation as herein illustrated, or may incline contra to the direction of rotation by merely inverting the implement.

The foregoing earth working roller unit is extremely advantageous not only for the initial preparation of seed beds to pulverize and compact the soil, but subsequently serves as an excellent implement for the breaking of top crusts and top soil cultivation.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An earth working roller, mounted in a frame adapted for draft by a tractor, comprising a transversely extending draft assembly mounted on the frame, and a row of earth working rings surrounding the draft assembly in relatively rotatable relation; the rings being hubless, having a substantially greater internal diameter than the outside diameter of said draft assembly, and each comprising a band-like rim having a plurality of circumferentially spaced teeth projecting outward therefrom; the row being arranged for limited loose play endwise between said rims.

2. An earth working roller, mounted in a frame adapted for draft by a tractor, comprising a transversely extending draft cylinder mounted on the frame, and a transverse row of earth working rings surrounding the draft cylinder in relatively rotatable relation; the rings being hubless and each comprising a band-like rim having a substantially greater internal diameter than the outside diameter of the draft cylinder, and a plurality of circumferentially spaced, outwardly projecting teeth on the rim; each ring comprising an internally flat, band-like rim of substantially greater width than thickness, said row of rings being arranged on the draft cylinder for limited loose play endwise between the rims, and the teeth being of lesser width than the corresponding rim and centered thereon between its ends.

3. An earth working roller, mounted in a frame adapted for draft by a tractor, comprising a transversely extending draft assembly including enlarged stop members at its ends, and a row of enlarged, toothed, earth working rings surrounding the draft assembly between said stop members; said rings being hubless and having limited end play relative to each other, each ring comprising a band-like rim of greater width than thickness and having an internal diameter substantially greater than the external diameter of said draft assembly whereby to permit of substantial radial play of said rings relative to each other and to said assembly.

4. In an earth working roller which includes a transversely extending draft assembly mounted in a frame adapted for draft by a tractor, and a row of earth working rings surrounding the draft assembly in end to end, relatively rotatable relation; the rings being hubless and each comprising a band-like rim having a plurality of circumferentially spaced teeth projecting outward therefrom, each rim being of greater width than thickness, and the rims having a substantially greater effective internal diameter than the effective outside diameter of said draft assembly; the differential between said effective diameters being materially in excess of the thickness of the rims whereby upon relative up and down play of adjacent rings a distance greater than said thickness, the inside of the lowermost one of said adjacent rings is exposed, laterally and at the lower portion, below the corresponding portion of the rim of the other one of said rings.

THEODORE G. SCHMEISER.

REFERENCES CITED

The following references are of record in the file of this patent:

UNITED STATES PATENTS

| Number | Name | Date |
|---|---|---|
| D. 137,446 | Schmeiser | Mar. 14, 1944 |
| 324,208 | Alexander | Aug. 11, 1885 |
| 1,802,556 | Hendricks | Apr. 28, 1931 |
| 1,884,803 | Miller | Oct. 25, 1932 |